(12) United States Patent
Lin

(10) Patent No.: US 6,981,442 B1
(45) Date of Patent: Jan. 3, 2006

(54) DEVICE FOR ADJUSTING GAP BETWEEN FEEDING TUBE AND BLADE DISK OF FOOD PROCESSORS

(75) Inventor: Wei-Chih Lin, No. 27, Huairen St., Banchiao City, Taipei (TW)

(73) Assignees: Wei-Chih Lin, Taipei (TW); Pin-Huang Wu, Taoyuan (TW)

( * ) Notice: Subject to any disclaimer, the term of this patent is extended or adjusted under 35 U.S.C. 154(b) by 0 days.

(21) Appl. No.: 10/873,153

(22) Filed: Jun. 23, 2004

(51) Int. Cl.
| | |
|---|---|
| A23L 1/00 | (2006.01) |
| A23N 1/00 | (2006.01) |
| A23N 1/02 | (2006.01) |
| A47J 43/046 | (2006.01) |
| A47J 43/07 | (2006.01) |

(52) U.S. Cl. .......................................... 99/511; 99/513

(58) Field of Classification Search .................. 99/348, 99/492, 509–513, 485, 495; 366/205, 206, 366/96–98, 197, 291, 297–300, 314, 601; 241/282.1, 282.2, 282.5, 292.1, 199.12, 37.5, 241/92, 285.1, 285.2; 494/36, 37, 43, 47, 494/10, 85; 426/518, 519, 533, 599
See application file for complete search history.

(56) References Cited

U.S. PATENT DOCUMENTS

| | | | | | |
|---|---|---|---|---|---|
| 4,700,621 | A | * | 10/1987 | Elger .......................... | 99/511 |
| 5,289,763 | A | * | 3/1994 | Le Rouzic et al. ........... | 99/503 |
| 5,355,784 | A | * | 10/1994 | Franklin et al. .............. | 99/492 |
| 5,392,699 | A | * | 2/1995 | Tai ............................... | 99/492 |
| 5,421,248 | A | * | 6/1995 | Hsu ............................. | 99/512 |
| 5,433,144 | A | * | 7/1995 | Lee .............................. | 99/512 |
| 5,495,795 | A | * | 3/1996 | Harrison et al. .............. | 99/492 |
| 5,784,954 | A | * | 7/1998 | Kokot et al. .................. | 99/511 |
| 5,819,641 | A | * | 10/1998 | Hsu ............................. | 99/492 |
| 5,924,357 | A | * | 7/1999 | Chen ........................... | 99/511 |
| 6,050,180 | A | * | 4/2000 | Moline ........................ | 99/511 |
| 6,543,340 | B1 | * | 4/2003 | Fouquet ....................... | 99/511 |
| 6,813,997 | B1 | * | 11/2004 | Lin .............................. | 99/511 |

* cited by examiner

*Primary Examiner*—Timothy F. Simone
(74) *Attorney, Agent, or Firm*—Troxell Law Office, PLLC

(57) ABSTRACT

A food processor includes a base, a lower cap, a blade unit and a top cap. The top cap has a fixed tube extending from an underside thereof and a sleeve is movably mounted to the fixed tube. A board is sandwiched between the sleeve and the blade disk of the blade unit so as to move the sleeve upward which then fixed to the fixed tube by an adhesive layer such that a gap with a fixed width is defined after the board is pulled away. The food can be cut into tiny particles and juice can be squeezed via the gap.

7 Claims, 7 Drawing Sheets

DEVICE FOR ADJUSTING GAP BETWEEN FEEDING TUBE AND BLADE DISK OF FOOD PROCESSORS

FIELD OF THE INVENTION

The present invention relates to a food processor with a sleeve movably mounted to the feeding tube and a board removably sandwiched between the sleeve and the blade disk. The gap is defined by securing the sleeve to the feeding tube and the board is removed after the sleeve is secured.

BACKGROUND OF THE INVENTION

A conventional food processor "a" is disclosed in FIG. 8 and generally includes a top cap "b" having a feeding tube "b1" and first grinding teeth "b2" are defined in an underside of the feeding tube "b1". A blade disk "c" is located beneath the feeding tube "b1" and has blades "c1" and second grinding teeth "c2" which is located corresponding to the first grinding teeth "b2". Food is fed through the through hole "b3" of the feeding tube "b1" and cut by the blades "c1" and ground by the first and second grinding teeth "b2" and "c2" so that the juice of the food can be obtained. This is used in the conventional food processors.

The result of the conventional food processor is good due to the gap defined between the feeding tube "b1" and blade disk "c". If the gap is too wide, the particles are too large and cannot meet the requirements of squeezing the nutrition from the food. If the gap is too small, the first grinding teeth "b2" of the feeding tube "b" and the second grinding teeth "c2" of the blade disk "c" tend to be worn out or even jammed with each other. This could damage the motor. Furthermore, if the gap is too small, a slightly deformation of the blade disk "c" or the awkward assembling tolerance between the blade disk "c" and the feeding tube "b1" may also damage the feeding tube "b1" by the rotating of the blade "c1" on the blade disk "c".

Therefore, the gap between the feeding tube and the blade disk must be kept as a fixed width so that the food processor can function normally. Nevertheless, during a mass production, the gap cannot be maintained to be a fixed width gap because of the above mentioned inherent shortcomings so that the quality control of the conventional food processors cannot be satisfied.

The applicant has years of experience in design and manufacturing of the food processors and uses a board removably inserted between a sleeve movably mounted on the feeding tube and the blade disk so as to improve the shortcomings of the conventional food processors.

SUMMARY OF THE INVENTION

The main object of the present invention is to provide a food processor wherein a sleeve is movably mounted to a feeding tube on an underside of the top cap and a board is located between the sleeve and the blade disk when the top cap is mounted onto the lower cap. By the board, the sleeve can be pushed upward and then be secured to the feeding tube so as to maintain a gap with fixed width after the board is pulled away.

Another object of the present invention is to provide a food processor which uses a board to define the gap with fixed width and avoids awkward assembling by assemblers so as to ensure the assembling quality.

In order to achieve the objects mentioned above, the present invention relates to a food processor which includes a base, a lower cap, a blade unit and a top cap. The top cap has a feeding tube extending from an underside thereof and a plunger is movably inserted in the feeding tube. The blade unit has a blade disk thereon and the lower cap has a space for receiving the blade unit. The base has a motor received therein and connected to the blade unit. The feeding tube includes a fixed tube fixed to the top cap and a sleeve movably mounted to the fixed tube. An adhesive layer is provided between the contacting area of the fixed tube and the sleeve. A board is sandwiched between the underside of the sleeve and the blade disk and pulled away after the top cap is mounted to the lower cap. The sleeve is moved upward by the board and fixed to the fixed tube so that a gap with a fixed width can be defined between the sleeve and the blade disk after the board is pulled away due to the fixing of the adhesive layer. This ensures that the food can be processed to be tiny particles.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
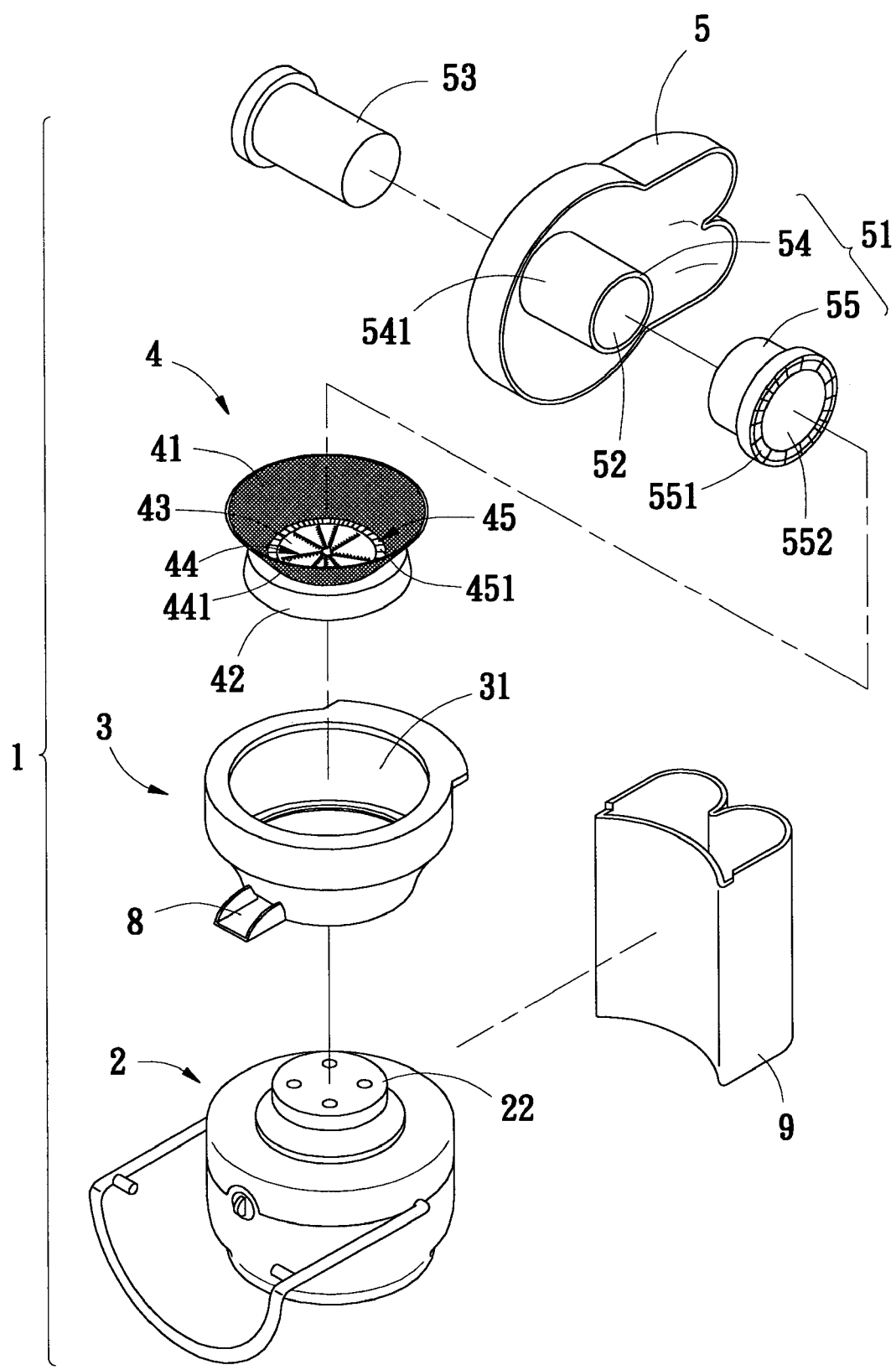
FIG. 1 is an exploded view to show the food processor of the present invention.
Figure 2:
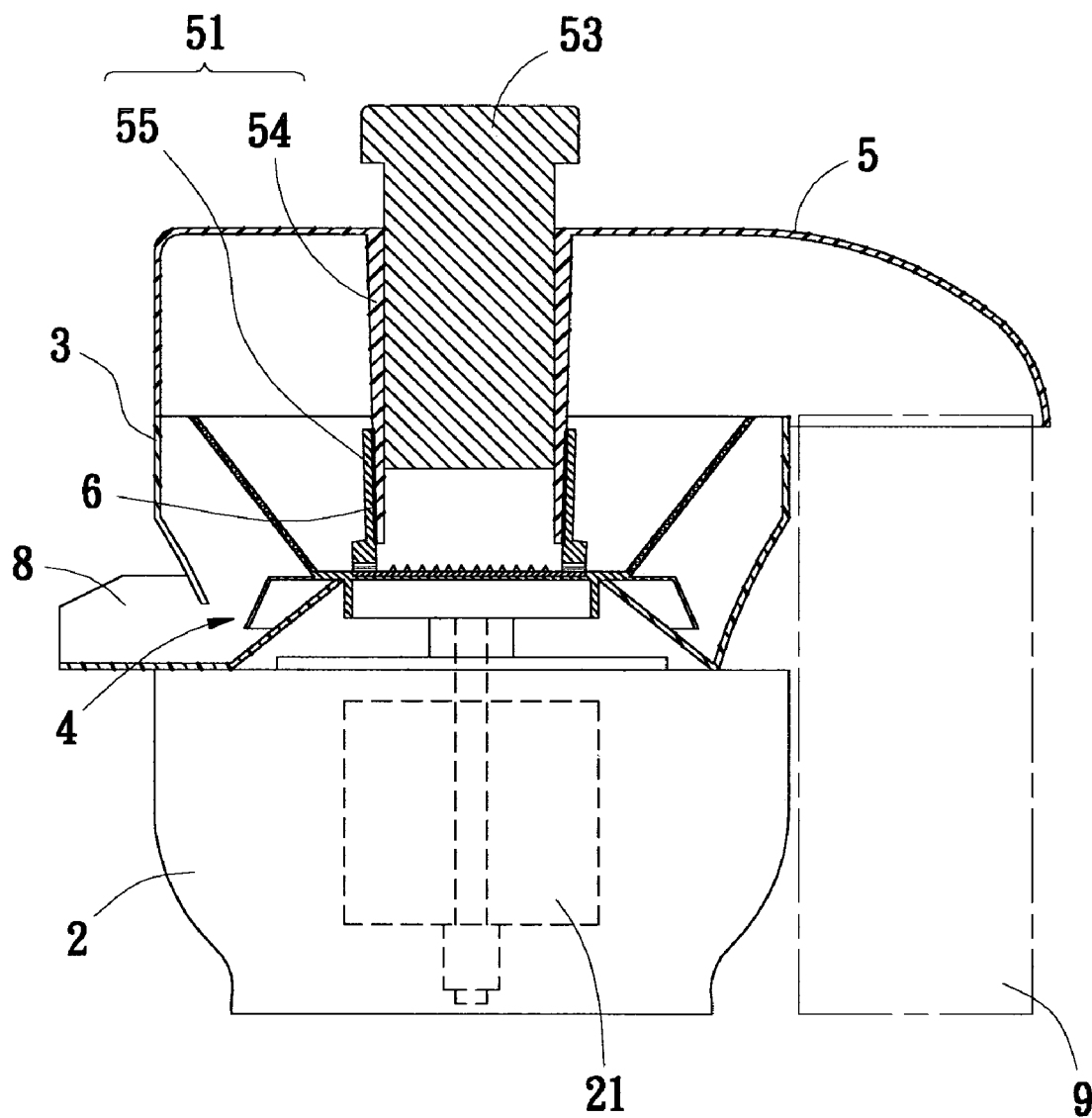
FIG. 2 is a cross sectional view of the food processor of the present invention.

Referring to FIGS. 1 and 2, the food processor 1 of the present invention comprises a base 2, a lower cap 3, a blade unit 4 and a top cap 5.

The top cap 5 has a feeding tube 51 extending from an underside thereof and a passage 52 is defined through the feeding tube 51 so that a plunger 53 can be movably inserted in the passage 52 in the feeding tube 51. The feeding tube 51 includes a fixed tube 54 and a sleeve 55 which is mounted to the fixed tube 54. The fixed tube 54 is a cylindrical tube and includes a tapered outer surface 541 and the sleeve 55 has a tapered inner surface 552 so as to match with the tapered outer surface 541 of the fixed tube 54. The sleeve 55 includes a flange extending from a lower end thereof and the flange has a first grinding surface 551. An adhesive layer 6 located between the tapered outer surface 541 of the fixed tube 54 and the tapered inner surface 522 of the sleeve 55 to match the fixed tube 54 with the sleeve 55.

The blade unit 4 has a blade disk 43 and a filter portion 41 extends upward from the blade disk 43 and a skirt portion 42 for preventing the juice of the food from leakage extends downward from the blade disk 43. The blade disk 43 includes cutting member 44 located at inner positions and a second grinding surface 45 at outer positions. The second grinding surface 45 is located corresponding to the first grinding surface 551. The cutting member 44 has a plurality of blade 441 extending therefrom and the second grinding surface 45 includes a plurality of grinding teeth 451.

The lower cap 3 has a space 31 defined therein so as to receive the blade unit 4 therein. The base 2 has a motor 21 received therein which has a connection portion 22 which is connected to the blade unit 4.

Figure 3:
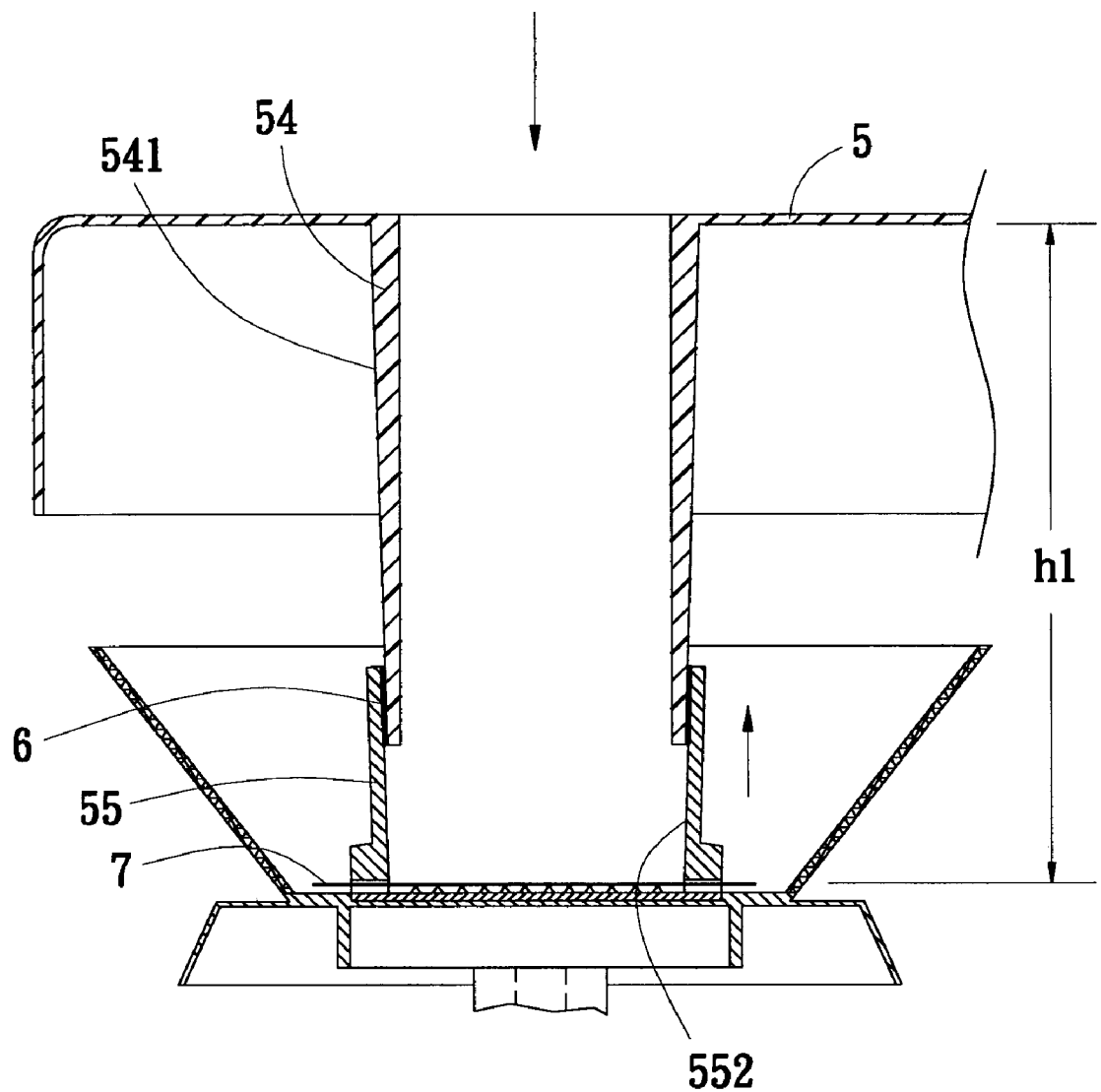
FIG. 3 shows a board is sandwiched between the sleeve and the blade disk.
Figure 4:
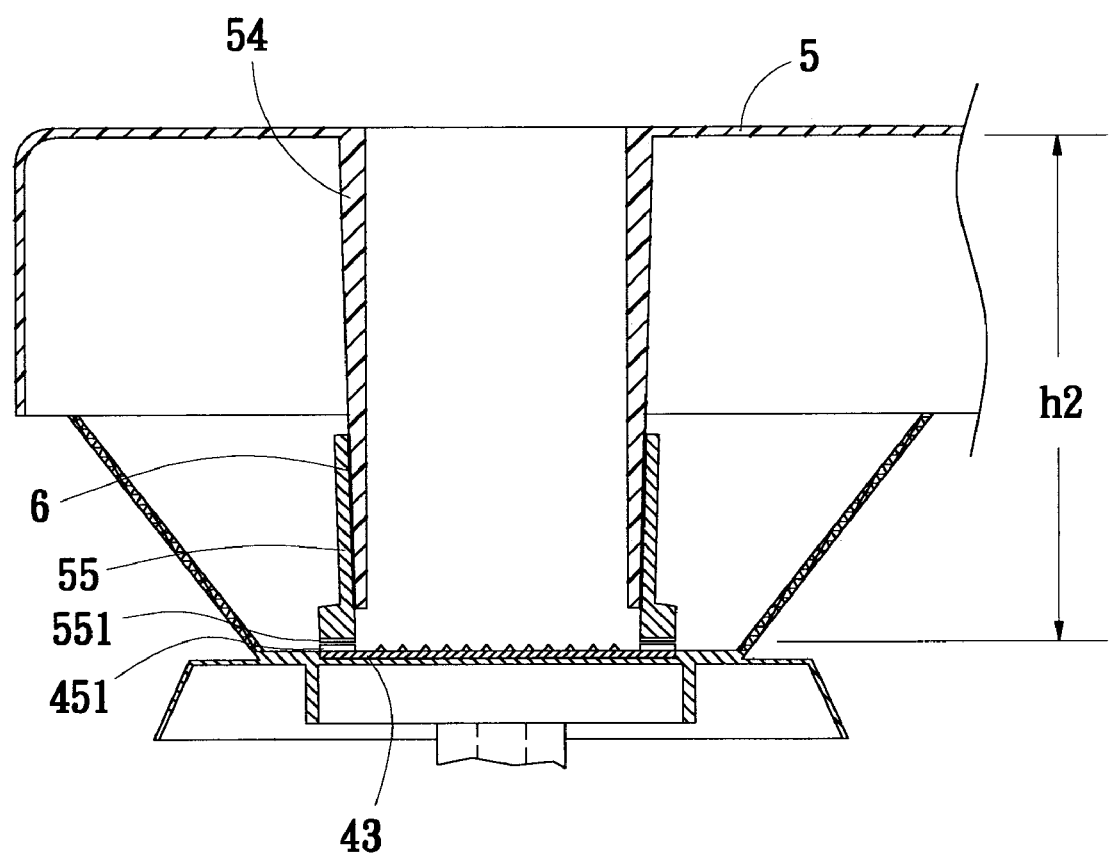
FIG. 4 shows the sleeve is positioned after the board is pulled away.

Referring to FIGS. 2 to 4, when assembling the food processor, the base 2, the lower cap 3 and the cutting unit 4 are assembled as one piece, and the sleeve 55 is freely mounted to the fixed tube 54 of the feeding tube 51. The distance "h1" of the combination of the sleeve 55 and the fixed tube 54 is larger than the distance "h2" from the underside of the top cap 5 to the blade disk 43. A board 7 which can be a paperboard, a plastic board or a gauge block, is sandwiched between the sleeve 55 and the blade disk 43 before the top cap 5 is mounted on the lower cap 3.

When mounting the top cap 5 to the lower cap 3, the top cap 5 presses the board 7 downward so it is pressed about the underside of the sleeve 55. This moves the sleeve 55 upward relative to the fixed tube 54. After few minutes, the sleeve 55 is fixed to the fixed tube 54 by the adhesive layer 6. The board 7 is then pulled away to define a gap as the thickness of the board 7 between the underside of the sleeve 55 and the blade disk 43. The gap between the first and second grinding surfaces 551 and 45 is fixed so that the food can be ground to be tiny particles and the juice can be squeezed out. The tiny particles and the juice flow out from the outlet 8 of the lower cap 8. Further referring to FIG. 2, the dreg can be collected in the collection box 9 connected to the top cap 5.

Figure 5:
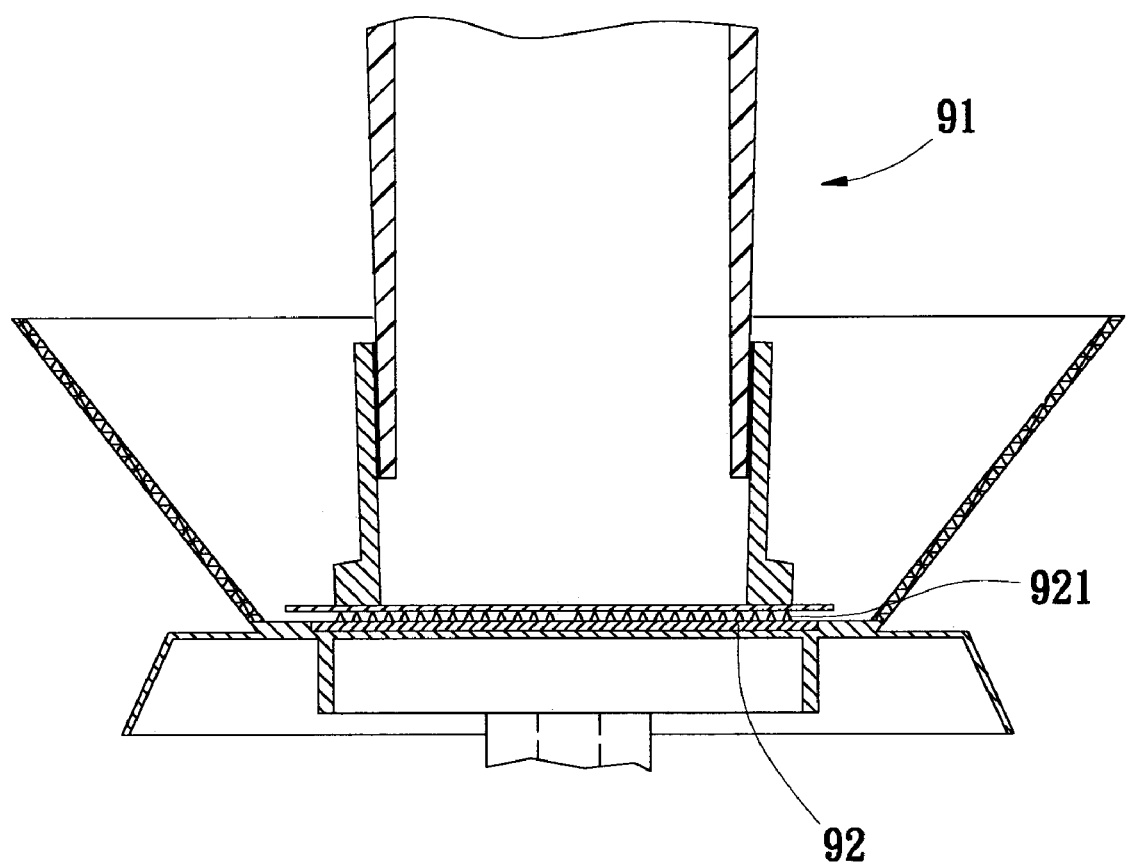
FIG. 5 shows a board sandwiched between the sleeve having a flat underside and the blade disk.

Referring to FIG. 5, in another embodiment, the feeding tube 91 may have a flat surface defined in a lower end thereof and the blade disk 92 includes a plurality of blades 921. A fixed gap can also be made between the feeding tube 91 and the blade disk 92 by using the board 7 of the present invention.

Figure 6:
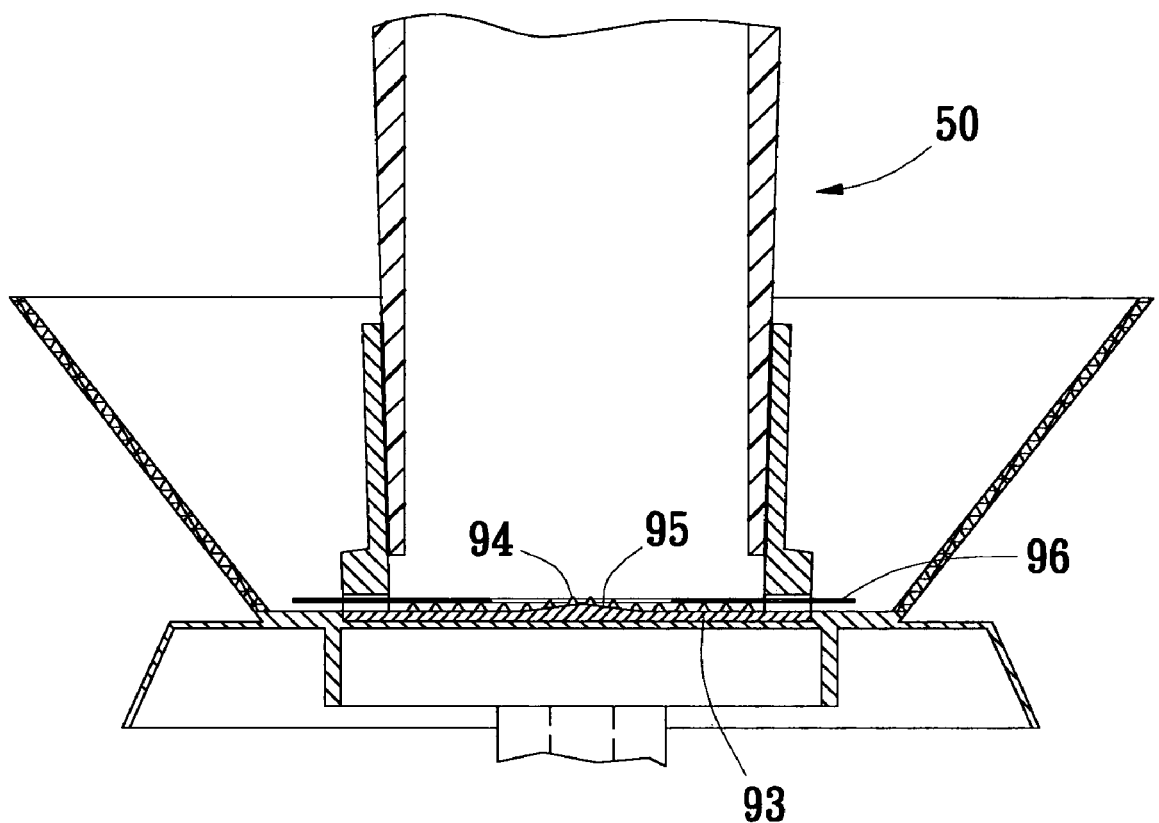
FIG. 6 shows a board sandwiched between the sleeve and the blade disk with a cone-shaped top surface.
Figure 7:
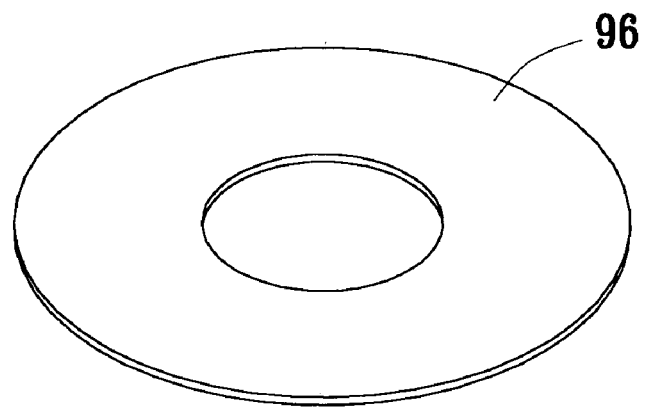
FIG. 7 shows the board used in the embodiment in FIG. 6.
Figure 8:
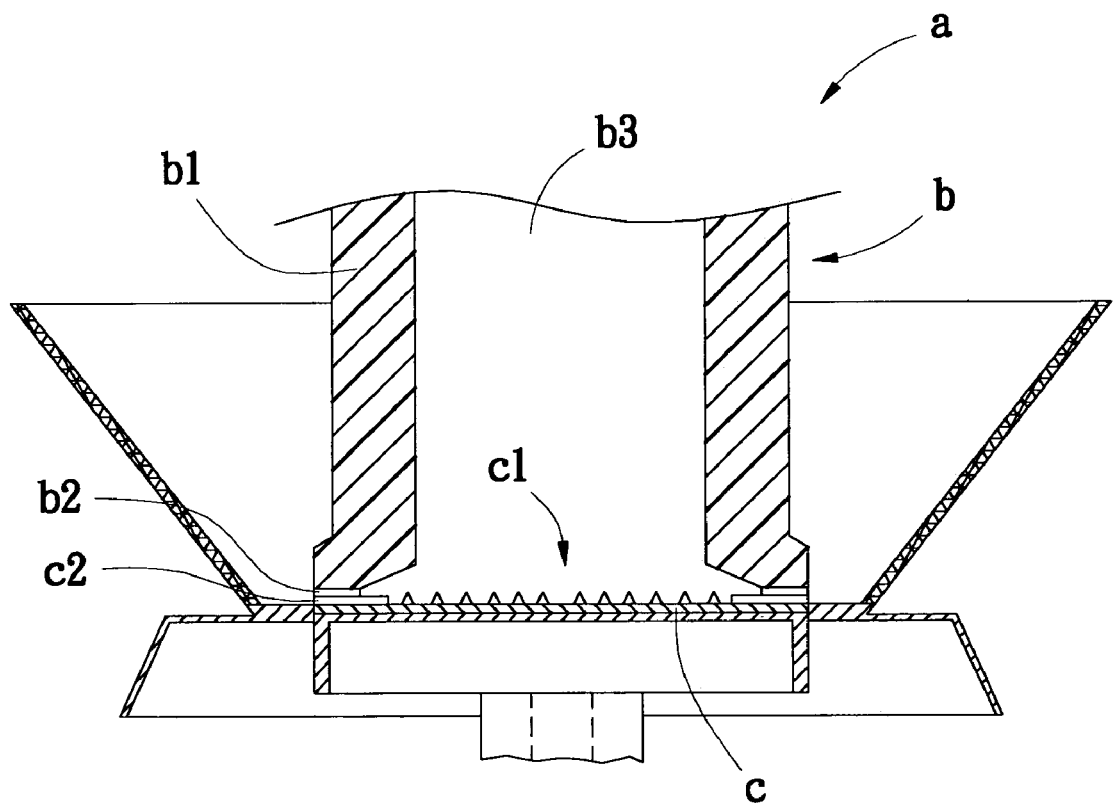
FIG. 8 is a cross sectional view to show the conventional food processor.

Referring to FIG. 6, when the blade disk 93 has a plurality of cutting teeth 95 of the cutting members 94, by using the board 96 as shown in FIG. 7, the gap can be formed and fixed as well.

The present invention includes the following advantages:

1. By using the board with a fixed thickness, the sleeve can be moved upward and fixed to the fixed tube so as to define a fixed gap after the board is pulled away so as to cut the food as desired.
2. By using the board, the errors made by the assemblers can be reduced to be minimum, this effectively maintain a stable quality of assembly in a mass production for the food processors.

While we have shown and described the embodiment in accordance with the present invention, it should be clear to those skilled in the art that further embodiments may be made without departing from the scope of the present invention.

What is claimed is:

1. A food processor comprising:
a base, a lower cap, a blade unit and a top cap, a feeding tube extending from an underside of the top cap and having a passage defined therethrough, a plunger movably inserted in the passage in the feeding tube, the blade unit has a blade disk, the lower cap having a space defined therein so as to receive the blade unit therein, the base having a motor received therein which has a connection portion which is connected to the blade unit, the feeding tube including a fixed tube and a sleeve which is mounted to the fixed tube, an adhesive layer located between the fixed tube and the sleeve, a board sandwiched between the sleeve and the blade disk, the sleeve being fixed to the fixed tube by the adhesive layer and the board being pulled away so as to define a gap between the sleeve and the blade disk.

2. The food processor as claimed in claim 1, further comprising a collection box connected to the lower cap, the blade unit including a filter portion and skirt portion to prevent the leakage of the juice.

3. The food processor as claimed in claim 1, wherein the fixed tube has a tapered outer surface and the sleeve has a tapered inner surface so as to match with the tapered outer surface of the fixed tube.

4. The food processor as claimed in claim 1, wherein the board is a paperboard with a fixed thickness.

5. The food processor as claimed in claim 1, wherein the blade disk includes cutting member located at inner positions and a first grinding surface, the sleeve having a second grinding surface defined in a lower end thereof and located corresponding to the first grinding surface.

6. The food processor as claimed in claim 1, wherein the feeding tube has a flat surface defined in a lower end thereof and the blade disk includes a plurality of blades.

7. The food processor as claimed in claim 1, wherein the blade disk has a plurality of cutting teeth extending therefrom.

* * * * *